April 12, 1966 R. H. BERNARD 3,245,695
TRAILING AND SUPPORTING IMPLEMENT FOR COMBINE HEADER
Filed March 30, 1964 3 Sheets-Sheet 1

INVENTOR.
ROBERT H. BERNARD
BY *Wells & St.John*
ATTYS.

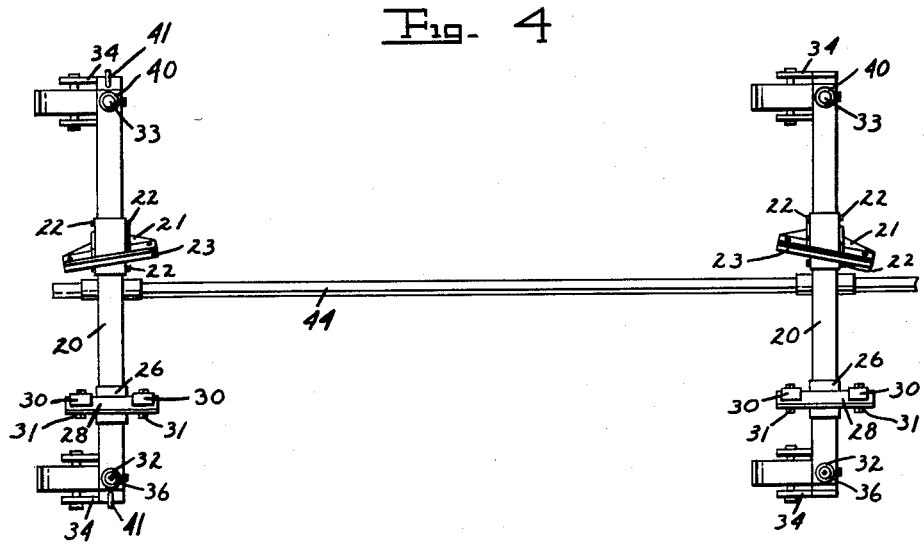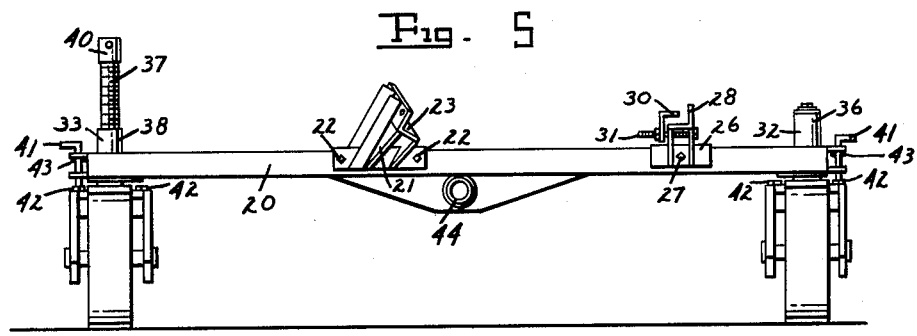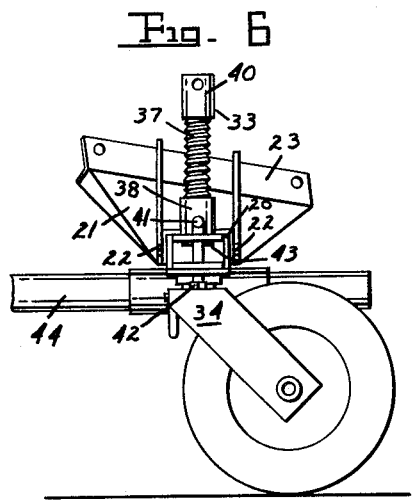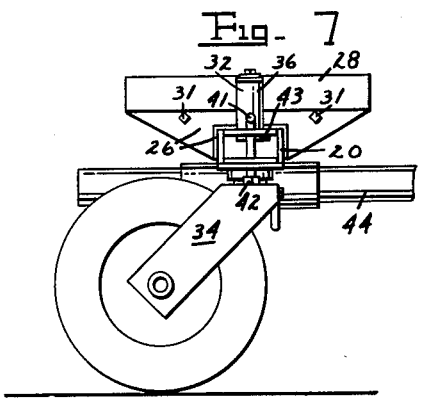

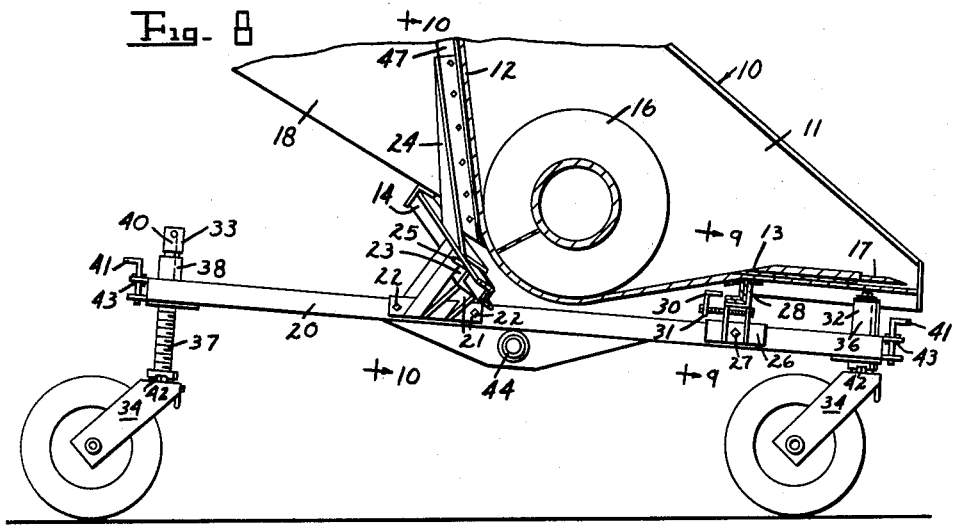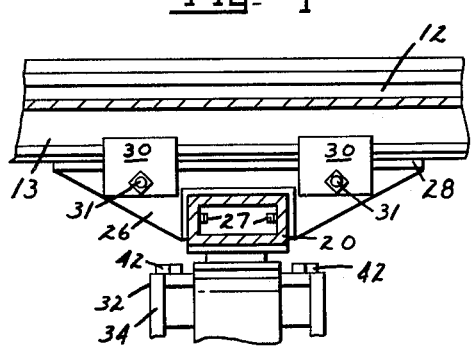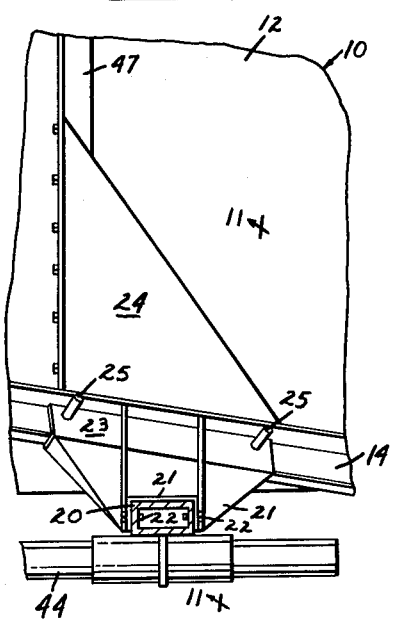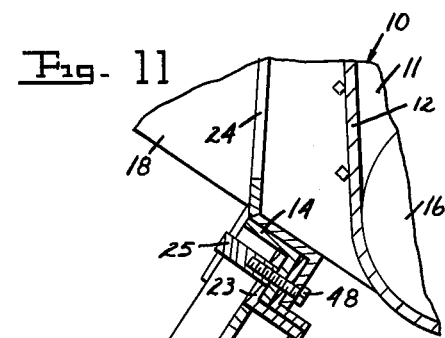

United States Patent Office 3,245,695
Patented Apr. 12, 1966

3,245,695
TRAILING AND SUPPORTING IMPLEMENT
FOR COMBINE HEADER
Robert H. Bernard, Box 344, Connell, Wash.
Filed Mar. 30, 1964, Ser. No. 355,721
4 Claims. (Cl. 280—400)

This invention relates to a novel trailing and supporting element for use below a combine header to provide a mobile support for the header after removal of the header from a combine.

In the use of combines for harvesting operations, it is necessary to periodically repair or renew portions of the harvester, the bulk of this work being done between harvesting seasons and during the winter months in the machine shop. During such repairs, it is necessary to take the header from the combine and work on it separately. It is also necessary to provide some positive support for the heavy and bulky header, which is quite unwieldy to move about and rather difficult to lift with conventional equipment. The present invention provides specially equipped trucks that fit beneath the header and clamp to it so that the header can be rolled about a supporting surface to any desired location or position. The trucks are located under the header while it is still on the combine, and are equipped to later position the header for attachment to the combine without external equipment.

It is a first object of this invention to provide two rather simple trucks designed to fit beneath a combine header and to releasably carry the header for elevational support and mobility about the supporting floor or ground surface.

Another object of this invention is to provide such a support that can be readily utilized to trail the header behind other equipment for highway or other travel use.

Another object of this invention is to provide such a support implement equipped with jacks to selectively raise the implement to vary the height of the header above the ground surface.

These and further objects will be evident from a study of the enclosed drawings taken together with the following detailed description of one preferred embodiment of the invention. It is to be understood that this embodiment of the invention is merely exemplary, and that it is not intended to restrict or define the invention as it is set out in the claims which follow.

In the drawings:

FIGURE 4 is a top view of the implement;

FIGURE 5 is an enlarged rear view of the implement as seen from the left hand end of FIGURE 4;

FIGURE 6 is a side view of one truck as seen from the left in FIGURE 5;

FIGURE 7 is a side view of the same truck as seen from the right in FIGURE 5;

FIGURE 8 is an enlarged cross sectional view taken along line 8—8 in FIGURE 2, showing the positioning of the rear truck beneath a header;

FIGURE 9 is an enlarged sectional view taken along line 9—9 in FIGURE 8;

FIGURE 10 is an enlarged sectional view taken along line 10—10 in FIGURE 8; and

FIGURE 11 is an enlarged sectional view taken along line 11—11 in FIGURE 10.

Figure 1:
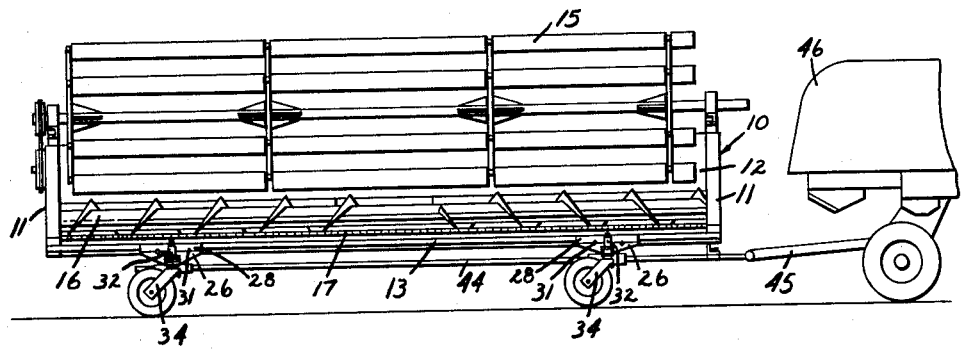
FIGURE 1 is an elevation view of a combine header trailing behind a combine and carried on the implement constructed according to this invention.
Figure 2:
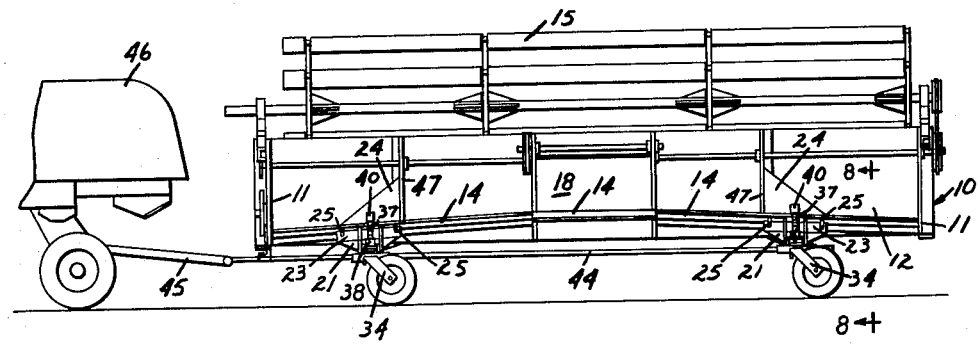
FIGURE 2 is a side elevation view opposite to FIGURE 1.
Figure 3:
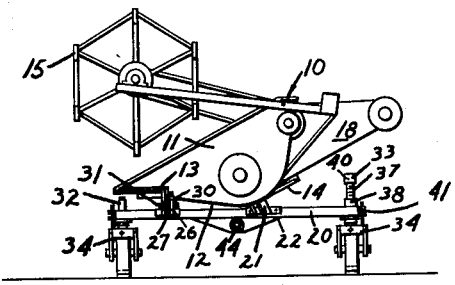
FIGURE 3 is a rear view of the header and the supporting implement as seen from the left in FIGURE 2.

Referring now to the drawings, there is shown, in FIGURES 1 through 3, the complete supporting and trailing implement as it would be used for highway travel to carry a header behind a combine. The header 10 includes a pair of frame ends 11 and a longitudinal sheet metal pan 12 that extends longitudinally between the frame ends 11. Directly below the sheet metal pan 2 is a front longitudinal brace shown in the drawings as 13. The brace 13 extends from one end of the header 10 to the other in a longitudinal direction and serves as a rigid support for the header structure. The header 10 is also provided with a rear longitudinal brace 14, the two braces 13 and 14 constituting the main longitudinal structural members of the header 10.

The header 10 conventionally carries a harvesting reel 15 and an auger 16 behind a sickle 17. There is also provided a central rearwardly extending conveyor apparatus 18 which serves to connect the header 10 to a combine 46 in the conventional manner. When mounted on the combine 46, the header 10 can be adjusted elevationally due to its connection at the conveyor 18. The header construction is conventional and differs slightly from one model of combine to another, but all such headers have similar structural features which will allow them to be adapted to the present device.

Basically, the trailing and supporting implement comprises front and rear trucks that are selectively mounted beneath the header 10 to take the weight of the header 10 and provide it with travel mobility due to the provision of caster wheel supports. Each truck comprises a transverse tubular frame member 20. The frame member 20 is located across the header 10 and directly below the sheet metal pan 12. This location can best be seen in FIGURES 3 and 8.

Fixed to the frame member 20 is a first mounting unit 21 located along the frame member 20 by means of bolts 22. At the top of the mounting member 21 is an angle iron 23 located complementary to the surfaces of the rear longitudinal brace 14. The rear longitudinal brace 14 is utilized in this instance to provide the main pulling strength for trailing of the header 10, and it has been found desirable to reinforce the brace 14 by means of a triangular bracket 24 that extends upwardly along a vertical angle iron 47 that also is part of the header frame. Two connecting bolts 48 (FIGURE 11) secure the lower edges of the bracket 24 to the rear longitudinal brace 14 and are locked in place by threaded lugs 25. The angle iron 23 on the mounting element 21 is provided with complementary apertures that slidably receive the lug 25, so as to fix the position of the angle iron 23 relative to the brace 14.

Spaced longitudinally from the mounting element 21 is a second mounting element 26. This mounting element 26 is located on the frame member 20 by means of bolts 27, and it includes an angle iron 28 having upwardly directed surfaces complementary to the front longitudinal brace 13. The mounting element 26 is provided with two angular clamps 30 releasably carried by clamp bolts 31, the angular clamps 30 being adapted to fit over the brace 13 to thereby secure the brace 13 to the angle iron 28.

Each frame member 20 is provided with a first caster wheel unit 32 that is mounted on the frame member 20 in a fixed elevational position and a second caster wheel unit 33 carried by a jack apparatus. The caster wheel units 32 and 33 are otherwise similar, and each includes a wheel mount 34 pivotally carried by means of a thrust bearing 35 and an internal supporting pivot rod (not shown). The elevationally fixed caster wheel units 32 are pivotally mounted relative to the frame member 20 by means of fixed bushings 36. The wheel units 33 are pivotally carried within a tubular screw 37 that is elevationally carried on the frame member 20 by means of a fixed thread support 38. At the top of each screw 37 is a sleeve 40 having radial apertures formed therein for reception of a rod or other device to manually turn the screw 37 relative to the threaded support 38. In this manner the end of each frame member 20 is provided with a wheel unit 33 can be elevationally lifted in the manner shown in FIGURE 8.

The exact details of the mounting elements 21 and 26 must vary depending upon the particular model of header 10 to be carried thereon. However, each rear mounting unit 21 will be provided with apertures to receive lugs similar to those shown at 25 and will include supporting surfaces complementary to the rear brace 14 of a particular header 10. To mount the individual trucks beneath the header, the screw 37 is turned to lift the ends of the frame member 20 and thereby assist in the positioning of the lugs 25 through the apertures in the angle iron 23 of the first mounting element 21. At the same time the angle iron 28 of the second mounting unit 26 will be located beneath the front longitudinal brace 13, the clamp 30 having previously been loosened in the manner shown in FIGURE 8. After the engagement of the lugs 25, the clamp bolts 31 can be tightened and the sleeve 40 is then turned to lower the wheel units 33 to the travel position shown in FIGURES 1 through 7. The utilization of the jacks assists in the positioning of the individual trucks beneath the header and also allows one to later return the header to the desired elevated position for mounting of the header on the combine 46. In this manner, no other jacks, winches or blocks are required to properly position the header for mounting on the combine 46.

The trucks as described can be used in a shop during the repair or replacement of any of the members on the header 10. The frame members 20 carry the combine 10 at a spaced location from the supporting ground or work surface, so that one can safely and conveniently work beneath the header 10. The header 10 can be manually moved about a floor to locate it more conveniently during such repairs.

The trucks serve a double purpose, in also providing a trailing support for the header 10 so that it can be carried behind a combine 46. This is preferably accomplished by means of a rigid tubular member 44 fixed to the respective members 20 along their lower surfaces and provided at its front end with a hitch member 45 releasably secured to the rear of a truck or the combine 46. The provision of the triangular braces 24 has been found to sufficiently strengthen the usual header framework to allow highway travel of the header 10 on this trailing implement.

In order to properly trail the header 10, it is necessary to lock the rear set of caster wheel units 32, 33 to a position wherein the wheels thereof are parallel to the longitudinal header 10. This is accomplished by means of a vertically movable locking pin 41 carried at each end of the rear frame member 20 (FIGURES 5 through 7), the locking pin 41 being selectively receivable in an upwardly open socket 42 fixed to the top surface of the wheel mounts 34. Each pin 41 is provided with an aperture within which is received a cotter pin 43 that either locks the pin 41 in its socket 42, or holds it from engagement with the socket 42 as shown in FIGURE 8. Thus, the user of the trucks can easily lock the rear trucks when this is required, and can as easily release the rear wheel units for complete caster action when the header frame is being worked upon in a shop.

The basic structure just described comprises the two trucks having transverse tubular frame members and caster units at each end, plus a pair of mounting units complementary to the longitudinal braces found beneath a header. One end of the frame member is elevationally adjustable by means of the jack unit, to allow proper positioning of the respective truck beneath the header and to facilitate the later positioning of the header on a combine. The trucks as described provide mobility to a header that was not previously possible, and eliminate the necessity of winches, cranes, jacks and supporting blocks that were previously used to accomplish similar purposes.

Since minor modifications will necessarily be required in order to utilize this invention with various models of headers, the peculiar structure illustrated in the drawings is not intended to limit the scope of the invention which is set out in the claims that follow this description. It is to be understood that equivalent devices and design changes can be utilized in order to effectively utilize the basic concepts disclosed herein.

Having thus described my invention, I claim:

1. A trailing and supporting implement for a combine header having first and second longitudinal braces extending along its underside, comprising:

a pair of transverse tubular frame members located at longitudinally spaced positions beneath the header;

first mounting means fixed to each frame member and extending upwardly therefrom, said first mounting means having a surface thereof complementary to said first longitudinal brace adapted to be abutted thereby, said first brace having fixed projections thereon receivable through complementary apertures formed in said first mounting means;

second mounting means fixed to each frame member and extending upwardly therefrom, said second mounting means having a clamp adapted to grip said second longitudinal brace;

and ground engaging caster wheel units pivotally mounted at each end of said frame members.

2. An implement as defined in claim 1 further comprising:

a rigid tubular member fixed respectively to said first and second frame members;

and a releasable hitch element mounted at one end of said rigid tubular member.

3. An implement as defined in claim 1 further comprising:

releasable locking means connected between the wheel units on one of said frame members and said one frame member adapted to selectively lock said wheel units with the wheels thereof parallel to said first and second longitudinal braces.

4. An implement as defined in claim 1 further comprising:

a vertically adjustable jack mounted at one end of each of said frame members, each jack having mounted thereon one of said wheel units adapted to elevationally position said wheel unit relative to the respective frame member.

References Cited by the Examiner

UNITED STATES PATENTS

| | | | |
|---|---|---|---|
| 234,336 | 11/1880 | Schenck | 280—35 |
| 234,836 | 11/1880 | Rorke | 280—35 |
| 750,612 | 1/1904 | Crofut | 280—43.2 X |
| 1,804,997 | 5/1931 | Manley | 280—79.3 |
| 2,127,972 | 8/1938 | Hutchinson | 280—43.2 |
| 2,509,824 | 5/1950 | Johnson. | |
| 3,013,807 | 12/1961 | Winterhoff | 280—179 |

LEO FRIAGLIA, *Primary Examiner.*